April 25, 1944.　　　A. J. McGILLICUDDY　　　2,347,191
PROTECTIVE FOOTWEAR
Filed Aug. 21, 1941　　　2 Sheets-Sheet 1
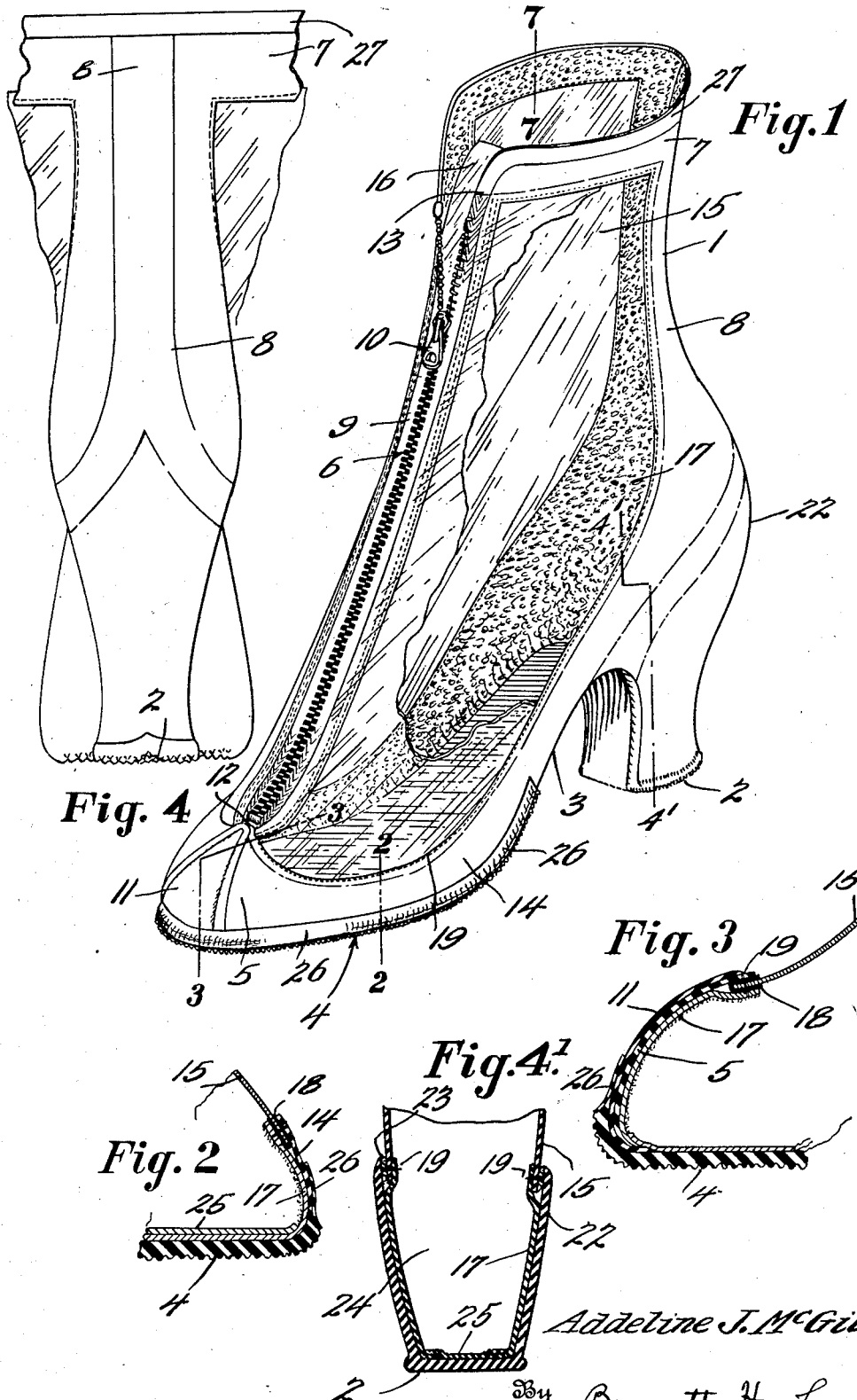
Inventor
Addeline J. McGillicuddy
By Bennett H. Levenson.
Attorney April 25, 1944.  A. J. McGILLICUDDY  2,347,191
PROTECTIVE FOOTWEAR
Filed Aug. 21, 1941  2 Sheets-Sheet 2
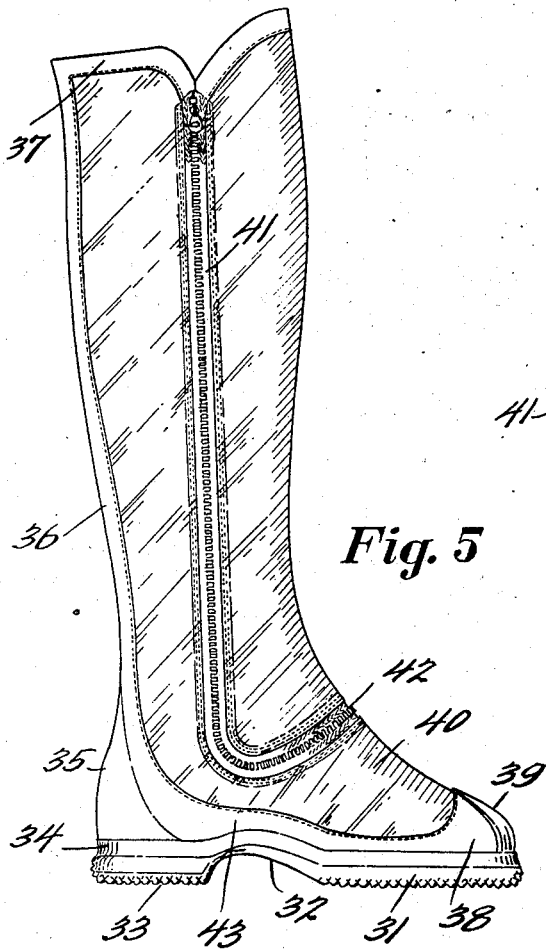
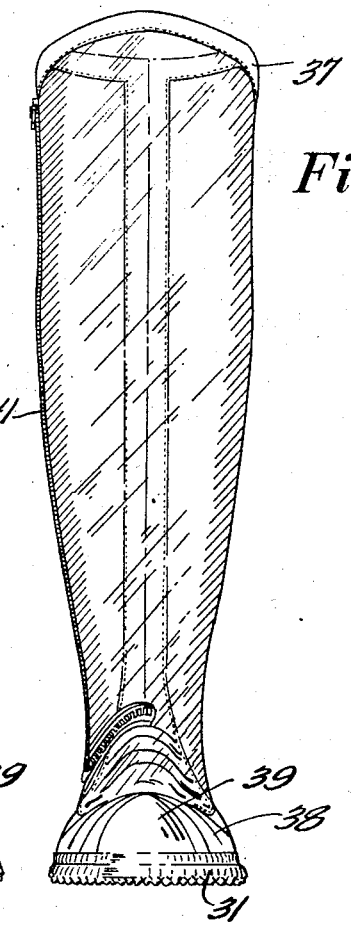
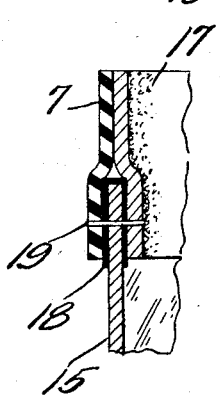
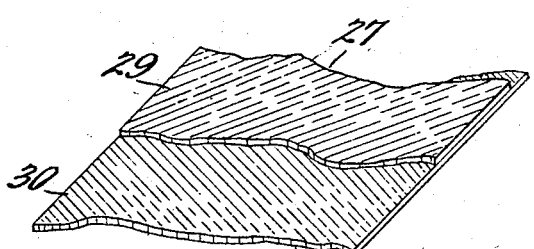
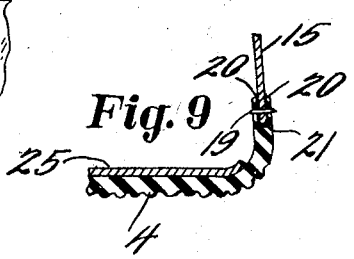
Inventor
Addeline J. McGillicuddy
By Bennett H. Svenson.
Attorney Patented Apr. 25, 1944

2,347,191

UNITED STATES PATENT OFFICE 2,347,191

PROTECTIVE FOOTWEAR

Addeline J. McGillicuddy, Spokane, Wash., assignor of one-half to G. A. Kjosness, Spokane, Wash., and one-fifth to Bennett H. Levenson, Washington, D. C.

Application August 21, 1941, Serial No. 407,822

9 Claims. (Cl. 36—7.3)

This invention relates to the art of footwear construction. More particularly it pertains to overshoes or galoshes, gaiters and similar protective articles, embracing within its scope novelty of structure.

In the art of footwear protection, primary reliance has in large measure been placed upon the use of rubber and rubberized fabric as a basis for manufacture, in view of its inherent attributes of flexibility, elasticity, water imperviousness, and in some cases even warmth has been a desired property. Some effort has been directed toward the utilization of substitute materials amongst which may be noted oiled silk, Cellophane, Pliofilm, fish skin, etc. While these have afforded some measure of utility, particularly from the standpoint of lightness in weight and esthetic transparency, this has been substantially offset by lack of durability and form retention properties, and general lack of qualities attainable through the use of rubber or analogous materials.

Moreover in view of the dependency of this country on foreign sources of supply, the desirability for efficient, practicable, synthetic materials in lieu of rubber has persisted. While many materials have suggested themselves for the manufacture of suitable protective footwear, no satisfactory solution of the problem has heretofore been attainable.

It is an object of my invention to obviate such difficulties and uncertainties as hereinabove described.

An additional object is to provide protective footwear of sturdy construction from material which in substantial measure may replace effectively the utilization of rubber or rubberized fabric.

Another object is to obtain footwear of the overshoe or galosh type which at least in part is manufactured from synthetic resinous materials manifesting the attributes of rubber or rubberized material, and capable of enhanced wearing qualities.

An additional object is the obtention of galoshes, gaiters or the like, which in part comprise a polyvinyl resin or other transparent synthetic material of the type disclosed hereinabove.

An important object is to provide a galosh or equivalent protective article of marked esthetic value and durability which is fabricated in part from a resin comprising the copolymer of vinyl chloride and vinyl acetate, and in part from rubber or rubberized material.

A further object of the invention is to devise a method for constructing protective footwear of material esthetic significance and improved wearing qualities, utilizing, at least in part, effective synthetic resinous material as a substitute for rubber or the like.

Other objects, advantages, and features of my invention will become apparent from the following description read in connection with the accompanying drawings in which similar elements are designated by like numerals:

Fig. 1 is a perspective view of a galosh manufactured in accordance with the present invention, with one panel partially broken away to reveal the supporting structure and internal details of construction.

Fig. 2 presents a fragmentary detailed section taken along the line 2—2 of Fig. 1.

Fig. 3 indicates a fragmentary sectional side view primarily directed to the toe portion and taken along the line 3—3 of Fig. 1.

Fig. 4 sets forth in vertical elevation a rear view of the galosh shown in Fig. 1, with the upper band portion opened, and partially broken away.

Fig. 4¹ shows in sectional view taken along 4¹—4¹ of Fig. 1 the heel structure and wall panel association.

Fig. 5 is a side view of a modified form of the invention, showing a leg covering galosh or gaiter.

Fig. 6 presents a frontal view of the modification shown in Fig. 5.

Fig. 7 is an enlarged detail section along line 7—7 of Fig. 1 of the wall panel attachment to the top band portion of the supporting structure.

Fig. 8 presents in enlarged partial perspective the laminated association of bias cut transparent sheets of the wall panel material, the graining of the respective sheets being angularly disposed.

Figs. 9 and 10 provide exaggerated sectional indications of wall panel and supporting structure jointure.

Within the scope of my invention it has been found that certain synthetic resinous compositions may be effectively adapted for protective footwear construction. Particularly satisfactory are the polymerized polyvinyl type of resinous compositions which in sheet form manifest flexibility, elasticity, water imperviousness, and wearing characteristics which are comparable in a most favorable degree with that attainable from utilization of rubber or rubberized material. In addition, sheets of this material are obtainable having either transparent, translucent or semi-transparent properties and of diversified color assortments, all of which contribute to an enhancement in esthetic protective footwear. It should be noted that the translucent or semi-transparent forms of the material, actually afford transparency when the article has been constructed in suitable form and size to provide an apt fit. Differently stated, although some sheet forms of the resinous composition may be classed as translucent or semi-transparent, their application in galosh construction associated with a comparatively snug, conforming fit leads to a desirably esthetic transparency.

It has been further ascertained that these resinous compositions, when inaptly associated in a given overshoe structure, may be subjected to undue tension for several hours at a time and thereby attain a permanent stretch; that is, an elastic recovery corresponding with that prevailing in the use of sheet rubber may not always result. This difficulty may however be substantially obviated by the appropriate construction, as will hereinunder be further described. The preferred embodiment of polyvinyl resin utilized is described hereinbelow and may be generally designated as a polyvinyl chloride containing composition, desirably plasticized and in rubber-like sheet form.

By utilization of the resinous composition as prepared and disclosed in my co-pending application Serial No. 407,821, the cracking tendency of plasticized polyvinyl resins, particularly at cold temperatures, is essentially obviated. Thus it has been found in accordance with the present invention, that a polyvinyl resin may be effectively adapted as a substitute for rubber or rubberized material in the art of galosh, or similar protective footwear construction.

Referring more particularly to the adaptation of the invention as presented by the embodiments shown on the drawings, the numeral 1 designates a galosh constructed in accordance with the present disclosure. The fundamental elements of the supporting structure of this galosh comprise the heel 2, shank 3, sole 4, toe 5, top band 7, and rear or backing strip 8, the parts being affixed to each other to provide an integral assembly. The closure means attachment 6 may be contemplated as an element of the supporting structure; it is however preferred in the following consideration to treat this as an auxiliary or completing element which may be relied upon to attain the desired extended form.

The closure means shown is a conventional "zipper" fastener with the usual fabric type supporting strip 9 and grasping element 10. One end of this "zipper" means is affixed at 12 to cap 11 at the lower portion of the galosh, while the other end is attached at 13 to top band 7.

To attain effective support from the integral assembly, the sole portion 4, shank 3 and heel 2 may desirably comprise comparatively thick rubber of the type normally utilized for these parts for affording wear resistance. The back strip 8, sole flange 14 and toe portion 5 as well as the top band 7 need not be of the same thickness or weight as the heel and sole, but nevertheless should desirably provide a legitimate supporting strength or stiffness to retain the form of the article, and support the wall panels in extended position, especially when the "zipper" is closed. The material utilized in fabrication of this upper portion of the support may likewise be rubber of a somewhat thinner gage than that customarily utilized for the sole and heel, or it may comprise rubberized fabric or any weather resistant material which will afford the requisite function.

In brief, the particular type of material utilized in the supporting structure is not of critical significance, the requisite being flexibility, wearing properties, moisture imperviousness, and generally weather protective; it should however desirably be of sufficient stiffness and weight to function as a support which will sustain the attachment of the transparent panels, without distorting the form of the article, especially when the "zipper" is closed to attain completed support. The requisite weight and stiffness should not however be taken to preclude the use of comparatively flexible material in the supporting structure, since the supporting strength is attained by the coordinated association of the respective parts comprising the supporting structure including the closure means. Cooperating with the supporting structure, the wall panels provide the form sustaining article.

In the event that any other type of fastening means is resorted to in lieu of "zipper" fastener 6, the supporting strips of the "zipper" may be replaced by a suitable material of optimum stiffness for connecting the top band 7 and toe portion 5, such as rubber, rubberized fabric, or the like. Thus the completed supporting structure determines the upper of the protective footwear, such as the galosh shown, and defines the lateral space within which the transparent or translucent wall panels 15 are positioned for appropriate attachment to the supporting means.

Some advantages attributable to the supporting structure are as follows. It is well recognized in the footwear art that esthetic properties are of prime importance in salability. Moreover, a supporting structure which retains the transparent panels extended, that is in a position free from any creasing tendency, results in longevity of wearing properties. This feature is particularly important where the transparent wall panels are inclined toward cracking, especially when subjected to creasing. It is similarly significant where the transparent or translucent material manifests a sluggish stretch recovery, since this extended position facilitates such recovery.

Further referring to the assembled structure of Fig. 1, 16 designates the shield for suitably backing the closure device 6 as well as affording the usual foot protection. This flap or shield may be of the same material as wall panels 15 and desirably is supplied with a felted fabric backing. Desirably the entire inner surface of the upper portion of the supporting structure may similarly be provided with a fabric backing 17 which may likewise be of felted characteristic.

The panels 15, desirably of a rubber-like polyvinyl resin, are attached to the flange portion 14, toe 5, closure device supporting strips 9, top band 7 and backing strip 8. Differently stated, the resinous panel is affixed to the supporting structure within the confines determined thereby and sustained in substantially upright position.

While certain polyvinyl resins of the type utilizable may under inapt conditions stretch to an extent beyond which the material is not retractable, it has been found that by appropriate patterning of the wall panels in the skeleton support, this stretch may be minimized to a point where it, in effect, is substantially negligible. The preferred embodiment of polyvinyl resin which satisfies the strictest requirements for overshoe or similar footwear construction, and has been proven to be of substantially greater wearing strength than analogous sheet rubber, is the plasticized conjoint polymer of vinyl chloride-vinyl acetate, of the type available in commerce as "Vinylite" series "V" resin. This material is made in the form of flexible, resilient sheets manifesting rubber-like properties. Some small measure of stretch may result from the application of tension to "Vinylite"-"V" over a considerable time interval, even though the tension is not continuous. It has been found that irretractable stretch may be substantially prevented by patterning the wall panels from a bias cut sheet of "Vinylite"-"V."

In explanation of the bias of "Vinylite," there is considered to be a graining effect upon the product as it is formed into appropriate sheets through the calendering treatment, this graining being indicated in exaggerated form in Fig. 8. While this material does not manifest a warp and weft, it does reveal definite stretch and strength tendencies in view of this graining. It has been found that if the "Vinylite" panel is cut in a manner to adapt it for positioning in the galosh skeleton so that this graining is angularly disposed to the vertical position of the galosh, which angular disposition corresponds with the bias cut indicated by the shade lines on Figs. 1, 5 and 6, the tendency toward irretractable stretch is substantially minimized.

The method of attachment of the transparent or translucent panels to the supporting structure may be subject to variation. As shown in Figs. 1–7 it is stitched to the supporting structure. A significant precaution within the purview of this invention is however desirable in the discovery that polyvinyl resins are not strictly compatible with rubber. This has been indicated by attempts to attach "Vinylite" directly to the rubber either by cementing or stitching. After the elapse of a comparatively short time interval, the rubber can virtually be peeled off from the "Vinylite" with which it had been in contact. Any stitching which has been resorted to serves merely to hold the parts in contact at the point that the stitches apply, there being indications of what appears to be a deterioration of the rubber, as a result of its contact with the polyvinyl resin. This may be obviated by the simple expedient shown in the enlarged detail section of Figs. 2–4. It will be seen from these figures taken at different portions of the galosh that the polyvinyl resinous wall panel is in Fig. 2 stitched between upwardly directed flange 14 and inner lining 17, with a separator or insulator means 18 preventing direct contact between the resin and the rubber. Similarly in Fig. 3 the resinous panel does not come into direct contact with the rubber portion of toe 5, being separated therefrom by an insulator 18 which may be leather, fabric, paper or analogous synthetic material inert to both rubber and the "Vinylite" used; if desired, or necessary, the insulator utilized may be chemically or oil treated to render it inert. Similarly the exaggerated sectional view of the association of top band 7 with the wall panels 15 shown in Fig. 7 resorts to separator 18 for encasing the edge of the "Vinylite" panel. The attachment is by stitch 19. It will be apparent that the insulator or separator design may be varied without departing from the invention herein. This same expedient manner of attachment is effective throughout the association of the "Vinylite" with the rubber supporting structure, in the galosh of Fig. 1 or gaiter of Figs. 5 and 6.

An alternative expedient for attaching the wall panel to the support is shown in Figs. 9 and 10. These detail views reveal the seating of the panel 15 in a groove or channel 20 of the flange or other portion of the support where contact with the panel is contemplated. In this modification, the groove or channel, or alternatively the edge of the panel to be seated therein, is provided with a separator 21 which, similarly to separator 18, is inert to both the polymerized vinyl resin and the rubber. The manner of supplying separator 21 is subject to considerable latitude dependent upon the skill of one versed in the art. It may overlap the panel 15 in the form of a U, as in Fig. 9, and be sewn simultaneously with its attachment to the rubber supporting structure. Conversely, the separator may comprise an inert coating or filler 21 or the like, supplied to the panel or groove 20 prior to the association of the panel with the supporting means.

While it has been suggested hereinabove that an incompatibility is believed to exist between the polyvinyl resin and the rubber, it is not intended to be restricted to any theory or explanation pertaining thereto. It is possible, for example, that the difficulty may be attributable to the particular plasticizer which is utilized in the preparation of the resin and not to the resin-rubber association. In any event, there appears to be considerable evidence to indicate that in the case of "Vinylite"-"V," as it is at present available in rubber-like sheet form for commercial adaptation, such incompatibility with respect to rubber of the type used in overshoe manufacture is manifested.

Fig. 4[1] indicates the attachment of the wall panels 15 to the counter portion 22 of the supporting structure, and it will be apparent that in this showing, the panels 15 are stitched by means 19 to the rubber portion 22 with an intervening separator 23 between the two types of materials. On the other side, the wall panel is affixed to the inner lining, which has been generally referred to as 17. In accordance with this view, the heel portion is desirably constructed to provide a heel cup 24, and the portion of the inner sole 25 therein is seated over the ends of the inner lining 17.

Numeral 25 as above indicated, designates a desirable inner sole of fabric, leather or similar material normally utilized for the purpose. The finish of the article may be subject to substantial variation in accordance with the dictates of the art. Thus the inner lining may comprise a cotton felt which, as shown, is provided over the complete inner surface of the upper, excluding the resin wall panels, the galosh closure device support, and the inner sole. The edge of the sole may desirably be provided with a cover strip 26 as a finishing expedient between sole 4 and flange 14. Similarly a finishing strip 27 may be utilized for the top band 7. In addition, the heel and counter as well as backing strip 8 may be supplemented by stiffening strips or the like to attain the essential strength and supporting qualities. It will be apparent, however, that many alterations and modifications may be supplied in the finish of the supporting structure as well as the polyvinyl panels. These variations will include resort to a diversity of coloration both as to the rubber and to the panels.

In the fabrication of the galosh, it is desirable that the size be determined on a basis to provide a snug fit, i. e. close conformity with the shoe and leg. The size retention is possible in view of the obviation of any stretch tendency by the appropriate wall panel association on a bias with the supporting structure, as above indicated. As previously disclosed, the size maintenance by avoiding any substantial stretch renders possible the utilization of the translucent or semi-transparent types of the "Vinylite" copolymer in a transparent galosh construction, since upon appropriately fitting the galosh over the shoe of the wearer, the shoe as well as adjacent leg portion can be clearly discernible therethrough, notwithstanding any particular coloration of the "Vinylite" utilized.

Figs. 5 and 6 present in sectional elevation an alternative adaptation of the invention in the form of a gaiter or legging. The principle of construction involved in this modification is generally analogous to that of the galosh which has been given detailed consideration hereinabove. The essential parts of this gaiter comprise the sole 31 integral with heel 33 through the arched portion 32. The breaker strip 34 affords the finishing expedient between the integral sole and heel and the rubber or rubberized fabric upper portion of the supporting structure which includes counter 35, upwardly directed flange portion 43, toe 38, rear or back supporting strip 36, and top band element 37. As in the consideration of the galosh, the "zipper" closure or fastening means 41 functions as an auxiliary element in the supporting structure to facilitate the form retaining features of the gaiter when closed as shown in Fig. 5; the "zipper" device shown involves the curved portion generally designated as 42 extending partially across the upper part of the vamp 40. This supporting structure determines the confines within which the transparent or translucent wall panels are affixed by stitching or in accordance with any desirable means, the necessary precautions being taken to allow for any incompatibility between the resinous wall panels and rubber.

The preferred embodiment of wall panel composition, as previously indicated, is the plasticized copolymer of vinyl chloride and vinyl acetate which is available in sheet form having rubber-like characteristics under the name of "Vinylite" series "V" resin. This material is manufactured in accordance with different gages or thicknesses. Thin films are produced having a thickness as low as .004", and thicker sheets are made of a gage in excess of .020", and it is believed that sheets are available having a gage of approximately .080". The thin film as such may be effectively utilized with the supporting structures disclosed herein. However an expedient thickness for galosh construction has been found to be the .020" gage which inherently supplies a contributing function to the effectiveness of the form retaining capacity of the supporting structure; while the greater thicknesses will afford a similar function, they are considered to be quite unnecessary for the purpose contemplated insofar as galosh structure is concerned, although they would function quite effectively in the case of the gaiter.

In the case of the thin film, it may expediently be used in laminated form as indicated in Fig. 8. It will be seen from the drawing that the respective films 27 and 28 are attached to each other, as by optimum heat application to the thermoplastic material, or by appropriate adhesive intended for attachment of "Vinylite" to "Vinylite." The showing contemplates the angularly disposed disposition of the graining referred to in exaggerated form as 29 and 30 for respective films 27 and 28. By cutting these films on a bias and laminating on a bias as herewith described, a reenforced wall panel material of improved strength and reduced tendency to stretch is obtained, thereby affording an optimum wall panel from the extremely thin film.

In my copending application No. 407,823, there is disclosed the production of galoshes and the like which in their entirety are fabricated from a synthetic material, exemplified by a resin of polyvinyl derivation. Pursuant to this disclosure, in addition to having wall panels of a transparent or translucent material, illustrated by "Vinylite," the supporting structure may also be made from material which is chemically identical with or generally similar to the wall panels.

It will thus be seen that by utilization of a suitable plasticized polyvinyl sheet resin of the type hereinabove described, which has preferably been treated in accordance with the disclosure of my co-pending application Serial No. 407,821, with preferably a non-paraffin containing mineral oil, and cut on a bias as well as appropriately attached to a weather resistant supporting structure, a light, sturdy, esthetic article of protective footwear is attainable. A substantial reduction of rubber is thereby rendered possible notwithstanding the fact that the article of footwear manifests improved durability and wearing qualities. It will be noted that in accordance with said co-pending application Serial No. 407,821, there is obtained a rubber-like polyvinyl resin which is temperature stable to the extent that it manifests resiliency, as well as resistance to cracking and to brittleness even at temperatures as low as approximately $-110°$ F.—corresponding with the temperature of solid $CO_2$. It has also been ascertained that the said resin is capable of withstanding substantially higher temperatures than the untreated or prior art resin before manifesting softness, incipient fusion or plasticity.

While I have described my invention in accordance with desirable embodiments, it is obvious that many changes and modifications may be made in the details of construction and in the combination and arrangement of parts without departing from the spirit of the invention as defined in the following claims.

Having thus set forth my invention, I claim:

1. A galosh comprising a supporting structure including a comparatively narrow top band, a comparatively narrow backing strip of relatively stiff material, a sole portion, reinforcements connected thereto and comprising a counter portion and a toe portion, a comparatively narrow relatively stiff closure device for fastening or unfastening said galosh and attached on one end to said band and on the other end to said sole portion or the toe or counter reinforcements carried thereby, and wall panels of water impervious transparent material in sheet form each having its edges attached to the various specified portions of the supporting structure, and to said closure device.

2. A galosh comprising a supporting structure including a comparatively narrow top band, a comparatively narrow backing strip of relatively stiff material, counter portion providing a heel cup, shank and sole, toe portion, a comparatively narrow relatively stiff closure device for fastening or unfastening the front of said galosh and attached on one end to said band and on the other end to said toe portion, and wall panels of water impervious transparent material in sheet form each having its edges attached to the various specified portions of the supporting structure, and to said closure device.

3. A galosh comprising a supporting structure including a top band, backing strip, counter portion providing a heel cup, shank and sole, toe portion, a closure device for fastening or unfastening the front of said galosh and attached on one end to said band and on the other end to said toe portion, and wall panels of water impervious, plasticized polyvinyl resin in rubber-like sheet form each having its edges attached to the various specified portions of the supporting structure, and to said closure device.

4. A galosh comprising a supporting structure of rubber including a top band, backing strip, counter portion providing a heel cup, shank and sole, toe portion, a closure device for fastening or unfastening the front of said galosh and attached on one end to said band and on the other end to said toe portion, and wall panels of water impervious, plasticized polyvinyl resin in rubber-like sheet form each having its edges attached to the various specified portions of the supporting structure, and to said closure device.

5. A galosh comprising a supporting structure including a top band, backing strip, counter portion providing a heel cup, shank and sole, toe portion, a closure device for fastening or unfastening the front of said galosh and attached on one end to said band and on the other end to said toe portion, and resinous wall panels of water impervious, plasticized copolymerized vinyl chloride and vinyl acetate in rubber-like sheet form each having its edges attached to the various specified portions of the supporting structure, and to said closure device.

6. The galosh as in claim 5, wherein the wall panels are cut on a bias relative to the graining characteristics of the resin.

7. The galosh as in claim 5, wherein the wall panels are cut on a bias relative to the graining characteristics of the resin and are laminated on a bias in a manner to angularly dispose the graining of the respective laminations.

8. A galosh comprising a supporting structure of rubber including a top band, backing strip, counter portion providing a heel cup, shank and sole, toe portion, a closure device for fastening or unfastening the front of said galosh and attached on one end to said band and on the other end to said toe portion, and resinous wall panels of water impervious, plasticized copolymerized vinyl chloride and vinyl acetate in rubber-like sheet form each having its edges attached on one end to said band and on the supporting structure, and to said closure device, said wall panels being provided with cloth binder around their edges whereby said wall panels avoid direct contact with rubber.

9. A galosh comprising a rubber supporting structure including top band, back strip, counter portion providing a heel cup, shank and sole, toe portion, a closure means attached on one end to said top band and on its other end to said toe portion, and wall panels of rubber-like water impervious resin of vinylite-V in sheet form fitted within the spaces determined by this supporting structure, a separator means, and means for attaching said wall panel through said separator means to said support structure.

ADDELINE J. McGILLICUDDY.